United States Patent [19]

Munter

[11] Patent Number: 4,698,809
[45] Date of Patent: Oct. 6, 1987

[54] METHOD AND APPARATUS FOR THE CHANNELIZED SERIAL TRANSMISSION OF REDUNDANTLY ENCODED BINARY DATA

[75] Inventor: Ernst A. Munter, Kanata, Canada

[73] Assignee: Northern Telecom Limited, Montreal, Canada

[21] Appl. No.: 846,440

[22] Filed: Mar. 31, 1986

[51] Int. Cl.$^4$ .................. G06F 11/00; H04L 25/49
[52] U.S. Cl. .................. 371/30; 340/347 DD; 375/19
[58] Field of Search .................. 371/30, 37, 55, 56, 371/47, 57; 340/347 DD; 375/19, 34

[56] References Cited

U.S. PATENT DOCUMENTS 3,405,235  10/1968  Carter .................. 371/55 X
3,646,517  2/1972  Waters et al. .................. 371/57
4,598,326  7/1986  Leiner .................. 340/347 DD
4,620,311  10/1986  Schouhamer-Immink .......... 375/19

Primary Examiner—Charles E. Atkinson
Attorney, Agent, or Firm—F. P. Turpin

[57] ABSTRACT

The invention provides a method of redundantly encoding $2^n$ binary words into $2^m$ encoded binary words, wherein $m > n$, as well as circuits for the encoding and decoding of the encoded binary words. The m words exhibit x invariant bits between themselves and the n words and the m - x bits are mapped uniquely to the remaining n - x bits of the binary words. As a result, the encoding and decoding circuits require translation devices of greatly reduced size from what would be expected through conventional design. The encoded data also exhibits all the desirable attributes of edge density and DC balance.

21 Claims, 7 Drawing Figures

METHOD AND APPARATUS FOR THE CHANNELIZED SERIAL TRANSMISSION OF REDUNDANTLY ENCODED BINARY DATA

The invention relates generally to the transmission of pulse code modulation (PCM) information on fiber optic transmission facilities and more particularly to a method of redundantly encoding binary words into encoded binary words as well as circuits for achieving the encoding and decoding functions and for communicating the encoded binary data.

It is generally known that it is desirable to transmit data on fiber optic transmission facilities using binary data as opposed to, for example, bipolar data becauses it simplifies the design of the optical transmitter and receiver circuits which can then operate in a simple ON-OFF manner. However, in order to allow synchronous recovery of the data at the receiver, the raw binary data must be encoded in a way that provides sufficient edges to allow extraction of the clock at the receiver.

A further requirement of binary data transmission is that the signal should be at least approximately balanced; that is, that it should contain an approximately equal number of one and zero pulses. This helps to keep the receiver amplifier design simpler by allowing AC coupling. It also means that the average power transmitted is constant at one-half peak power thereby making it possible to achieve a higher peak power for an LED or laser driver without exceeding its specifications. It is also desirable that the transmission scheme provide for detection of transmission errors.

Since contemporary telecommunication systems handle voice and data information in digital form, the information is usually handled in blocks or channels. For example, one such digital system presently in use throughout North America deals in 10-bit channels each comprising an 8-bit PCM sample, a signalling bit and a parity bit. Thus, the invention is directed to a method for the block redundant encoding of binary data to a form suitable for the transparent transmission of such binary data on a fiber optic transmission line and the circuits for translating the binary data to encoded binary data and vice-versa.

The known systems for the redundant encoding of binary data are either not suitable for the channelized serial transmission of PCM binary data or they suffer from one or more major problems in the realization of the function.

One such system is described in U.S. patent application No. 626,895 by W. D. Grover, filed on July 2, 1984 and assigned to the present assignee. It describes a method of communicating redundantly encoded binary data on a fiber optic transmission facility. The n-bit binary data is encoded into m-bit binary data using a read-only-memory (ROM). The ROM contains $2^m$ binary words that have been partitioned into sets of words that reflect predetermined criteria for run-length. The n-bit words are translated into corresponding m-bit binary words using pairs of selected sets from the translation tables in the ROM to provide a DC balanced signal on the transmission line. Frame synchronization of the data is achieved by translating the n-bit words into m-bit binary words using predetermined different sets of data from the translation tables in the ROM. A receiver is adapted to recognize the framing information by recognizing the translation sets from which the m-bit words were derived. One or more of such m-bit words are used to confirm synchronism between receiver and transmitter. Although such a system functions adequately under some circumstances, the robustness of the synchronization scheme is not acceptable under other circumstances.

Accordingly, it is an object of this invention to provide a system for the communication of redundantly encoded binary data which exhibits robust synchronization characteristics.

It is another object of the invention to provide a method for encoding a set of $2^n$ binary words into a set of $2^m$ binary words, wherein $m > n$ and wherein the two sets of words exhibit mutual x invariant bits thereby minimizing the size of the translation table. The size of the translation ROM is also minimized by mapping the remaining m-x bits of the linecode words to the n-x bits of the binary words. The redundant binary code generated by the method of the invention also provides the DC balance characteristics and inherent clock information desirable for binary data transmission.

In accordance with the invention, there is provided a method of redundantly encoding a set of $2^n$ binary words into $2^m$ encoded binary words wherein m is greater than n. The method comprises the step of selecting from the set of $2^m$ words, a first subset of words comprising one m-word for use as a synchronization word (sync-word) and its m distance-one neighbors. The sync-word is selected to meet predetermined criteria for internal maximum run-length of one-bits and DC balance. A second subset of words meeting predetermined criteria for head maximum run-length, tail maximum run-length and overall internal maximum run-length of one-bits is also selected from the set of $2^m$ words; this subset excludes the first subset of words. A third subset of words is then generated by eliminating from the second subset of words all m code words which could produce a non-aligned code word corresponding to any one word from the first set of words across channel boundaries. A fourth subset of words which provide x invariant bits between themselves and the words of the set of $2^n$ binary words is then selected from the third subset of words. Each of the words from the fourth subset of m words may then be assigned to one word of the set of $2^n$ binary words so that the m-x bits of the fourth subset of words map uniquely to the remaining n-x bits of the words in the set of $2^n$ binary words.

The resulting mapped sets provide a translation table whose encoded binary words exhibit all the desired characteristics for transmission as well as a sync-word which lends itself to a robust synchronization scheme. The sync-word is instantly recognizable at the receiver; it is also at least a two-bit error away from any other encoded word and it cannot be mimicked by an inter word sequence of encoded words.

Also in accordance with the invention, there is provided a circuit for the translation of a set of $2^n$ binary words into redundantly encoded binary m-words. There is provided a plurality n of input terminals and a plurality m of output terminals as well as a means for storing a plurality of m-words generated in accordance with the method described above. The storing means is responsive to any one of $2^n$ words appearing on the input terminals for outputting a predetermined one of the encoded words. The storing means has n data inputs, each one connected to a respective input terminal and only m-x data outputs wherein x represents the number of invariant bits between the n-bit words and the m-bit words. The m-x data outputs of the storing means are connected to predetermined respective ones of the output terminals and the inputs of the storing means corresponding to the x bits are connected to the remaining output terminals through respective transmission gates. A plurality m of transmission gates have their outputs connected to respective ones of the output terminals and their inputs connected to respective sources of ONE or ZERO levels wherein the pattern of ONEs and ZEROs define a predetermined special code word. A special-word select circuit is responsive to a control signal for inhibiting the output of the storing means and the x-invariant transmission gates and for enabling the plurality of transmission gates thereby to cause the predetermined special code word to appear on the plurality of output terminals.

Also in accordance with the invention there is provided a circuit for the translation of encoded binary m words into $2^n$ binary words. The circuit comprises a plurality m of input terminals and a plurality n of output terminals as well as a ROM for storing a plurality of n-x bit words generated in accordance with the method of the invention. The ROM is responsive to the m-x bit portion of the m-bit words appearing on the input terminals for outputting a predetermined n-x bit portion of the n-bit word on the output terminals. The x bits of the input m words are bypassed around the ROM and appear unchanged on the output terminals. The ROM may also provide identification of special flag words as well as error indications of invalid linecode words received at the input terminals.

The encoding method of the invention thus permits the realization of a transmission system for channelized redundantly encoded binary data which exhibits robust synchronization between receiver and transmitter and which requires translation table storing means of greatly reduced size. The invention also provides a measure of error detection for the received data.

An example embodiment of the invention will now be described with reference to the drawings in which:

FIGS. 1A, 1B and 1C comprise a flow chart depicting a method of redundantly encoding binary data in accordance with the invention;

In order to clarify its description the invention will be described in the context of a system using a transmission frame of five hundred and twelve channels each comprising ten bits partitioned as eight-bit PCM, one parity bit and one signalling bit. This binary data is to be redundantly encoded to twelve-bit words for transmission on a fiber link and decoded to ten-bit data at a receiver.

Figure 1A:
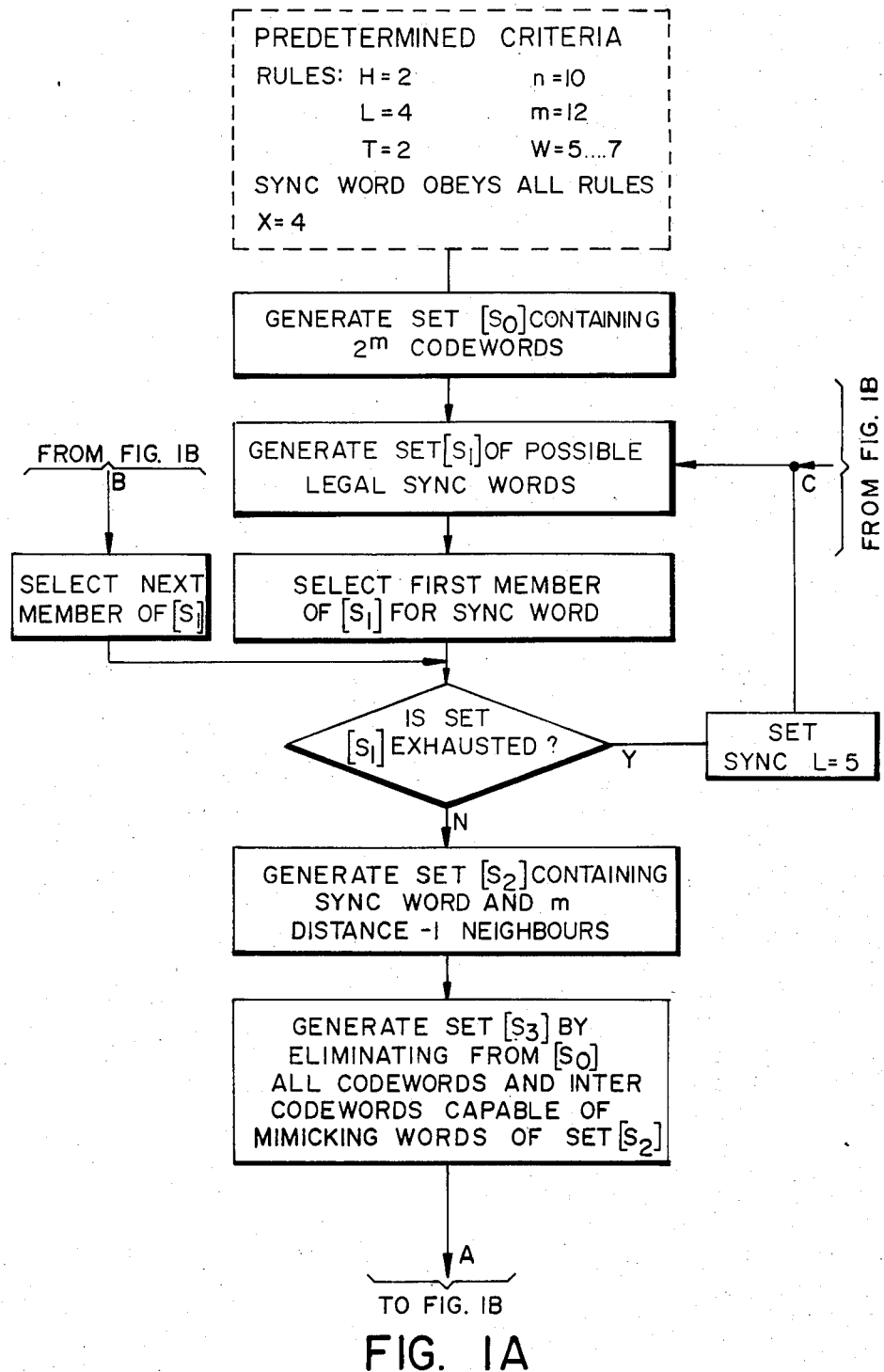
Figure 1B:
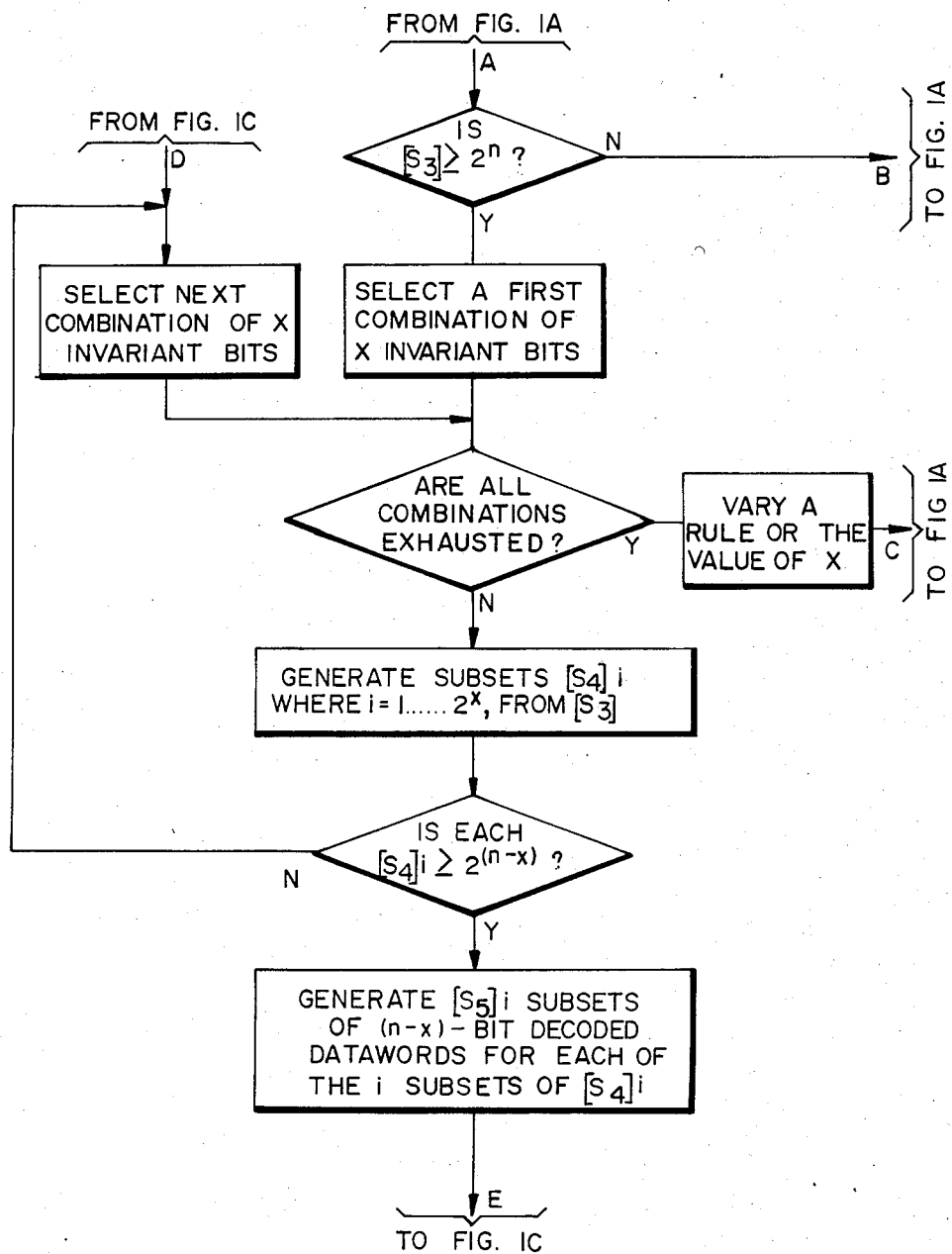
Figure 1C:
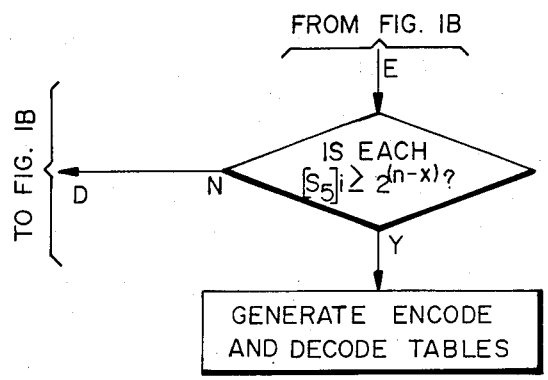

FIG. 1 depicts the method used to encode a possible $2^n$ binary words into m words where n=10, m=12, and the m words exhibit predetermined characteristics as described above and as set out in the first block of FIG. 1A.

Since only a fraction of the possible m-bit code words (4096) is needed for transmitting n-bit data (1024 words), some of the remaining valid codewords can be used for error detection, frame synchronization and indication of special link conditions or alarms. In the system of the invention, the derived set of linecodes lends itself to the use of all three of these possibilities. The unused or illegal bit patterns may be detected at the receiver and counted to give an estimate of the link bit error rate for maintenance purposes. A special twelve-bit SYNC codeword, not included in the set of 1024 codewords used for coding data is generated periodically at the transmitter and detected at the receiver to establish and maintain channel boundaries. It is also used to obtain PCM frame timing by indicating the position of channel 0. This method has the effect that synchronization is achieved instantly. The scheme of using a special SYNC word for synchronizing channels and frame boundaries requires not only that the SYNC word be different from data codewords, but also that it cannot be simulated in any non-channel-aligned window over adjacent data codewords. It is further desirable to make the scheme as robust as possible by choosing a SYNC code which is tolerant of bit errors.

A method of generating the desired codeword set as depicted in FIG. 1 will now be described. The principle of the code set generation is to start with the full set of 4096 code words and then successively eliminate codewords that do not meet predetermined criteria. Practically, the desired sets of data are obtained by performing a number of recursive interactive steps on the full set of $2^n$ words using a general purpose computer. If the remaining set contains at least 1024 code words divided into 16 subsets of 64 code words each, a useable code set has been found.

Step 1

From the set of $2^m$ binary words, select all the m words meeting predetermined criteria related to weight and run-length. In this example, the minimum and maximum weight of the words was set at 5 and 7 respectively in order to achieve a statistically DC balanced transmission of weight $\approx 6$. The maximum run-length internal to a code word was set at 4, the maximum run-length at the start or head of a code word was set at 2 and the maximum run-length at the end or tail of a code word was also set at 2. This combination of maximum intra, head and tail run-lengths ensures that a run-length of 4 is never exceeded regardless of the data sequence.

Step 2

From the set of $2^m$ words identified in step 1, select a SYNC word having the predetermined weight as well as meeting the predetermined criteria for head and tail run-lengths. The m(12) distance-1 neighbors (forbidden code words) of the SYNC word are then identified. In this example embodiment, the SYNC word was finally selected to be 782 in hexadecimal.

Step 3

Eliminate from the candidate set generated in step 1 all code words which are equal to the forbidden set or which could produce a non-aligned forbidden code word across channel boundaries. This procedure ensures that a sequence of valid code words will not contain a 12-bit sequence anywhere in a serial data stream that will equal or resemble (to within one bit) the SYNC code. A 12-bit code is accordingly eliminated if it meets any of the following tests:

first 11 bits of C=last 11 bits of Fi
first 10 bits of C=last 10 bits of Fi
first 9 bits of C=last 9 bits of Fi first 8 bits of C=last 8 bits of Fi
first 7 bits of C=last 7 bits of Fi
first 6 bits of C=last 6 bits of Fi
last 7 bits of C=first 7 bits of Fi
last 8 bits of C=first 8 bits of Fi
last 9 bits of C=first 9 bits of Fi
last 10 bits of C=first 10 bits of Fi
last 11 bits of C=first 11 bits of Fi
all 12 bits of C=all 12 bits of Fi
where:
   C=code word to be tested
   F (i=1 to 13)=forbidden set of code words.

If this elimination step results in less than 1024 code words in the candidate set, another SYNC word must be selected and the procedure repeated until at least 1024 code words are identified.

Step 4

A set of code words that provide x invariant bits between the n-bit words and the m-bit words selected above may then be identified. In this embodiment x=4 was selected.

For all possible combinations of x bits out of the 12 bits, partition the words of the candidate set into $2^x=(16)$ possible subsets of at least $2^{(10-x)}=(64)$ members such that each subset contains the code words of the candidate set which have the same values in the x bits. The resulting subsets provide the required information for drawing up a translation table wherein x bits of the 12-bit code words are equal to x bits of the 10-bit code words. With x=4 this means that an 8-bit wide translation table is sufficient for the encoder. Generally, the table must still contain 1024 entries because the remaining bits in each of the 16 subsets may not be equal across subsets. The candidate set of code words identifies the position of the 4 invariant bits in the 10-bit to 12-bit mapping.

Step 5

In this example embodiment, the previous step provided a candidate set containing a total of 1183 valid code words comprising 239 different 8-bit patterns. The 16 subsets of 8-bit words are not equal but they are redundant to the extent that most subsets contain more than the minimum 64 members. It is then possible to select 12-bit to 10-bit mappings such that not only 4 bits are invariant but that the remaining 8 bits of the 12-bit code words map uniquely to the remaining 6 bits of the 10-bit data words. The 4 invariant bits are given by the subset identifier and the remaining 8 bits form words to be decoded into 6-bit words by a translation ROM. The 6-bit decode words can then be assigned arbitrarily to 8-bit words as follows. If the same 8-bit value exists in every subset, it is assigned and removed from the list. If two or more 8-bit values exist such that all 16 subsets are covered but each subset contains only one of the two or more values tested, then these values are assigned to one 6-bit decode word and removed from the list. Of the 8-bit values left on the list, combinations are selected as just described but multiple occurrences across subsets are permitted.

This sequence of operations assigns to each of the 64 possible 6-bit decode values one or more 8-bit values without duplication. This ensures uniqueness of decoding and permits the use of a 256×6-bit decoding ROM instead of a 4096×6-bits ROM (assuming 4 invariant bits).

After the 1024 data code words are selected from the set of valid 12-bit code words, a number of codes may be left over as spares which may be used to implement out-of-band flags. These can be sent in place of data, decoded instantly at the receiving end, and may be used to indicate alarm conditions or to control maintenance functions. The following 15 special or flag code words have been selected in this embodiment because they are easily recognized with the decode ROM (as described later) which only looks at 8 bits of the linecode. The codes are listed in hexadecimal.

| 12-bit code | Identifier | 12-bit code | Identifier |
| --- | --- | --- | --- |
| 273 | 1 | 72A | 9 |
| 473 | 2 | 732 | A |
| 276 | 3 | 764 | B |
| 476 | 4 | 436 | C |
| 36A | 5 | 372 | D |
| A36 | 6 | 572 | E |
| 336 | 7 | 972 | F |
| 536 | 8 | | |

The 1024 translation words used in the described embodiment of the invention are listed in TABLE I at the end of disclosure. The listing is in hexadecimal; the first column lists 10-bit code words and every row lists one 10-bit word together with its corresponding and ensuing seven 12-bit words. The SYNC code selected in this embodiment was H782.

Figure 2:
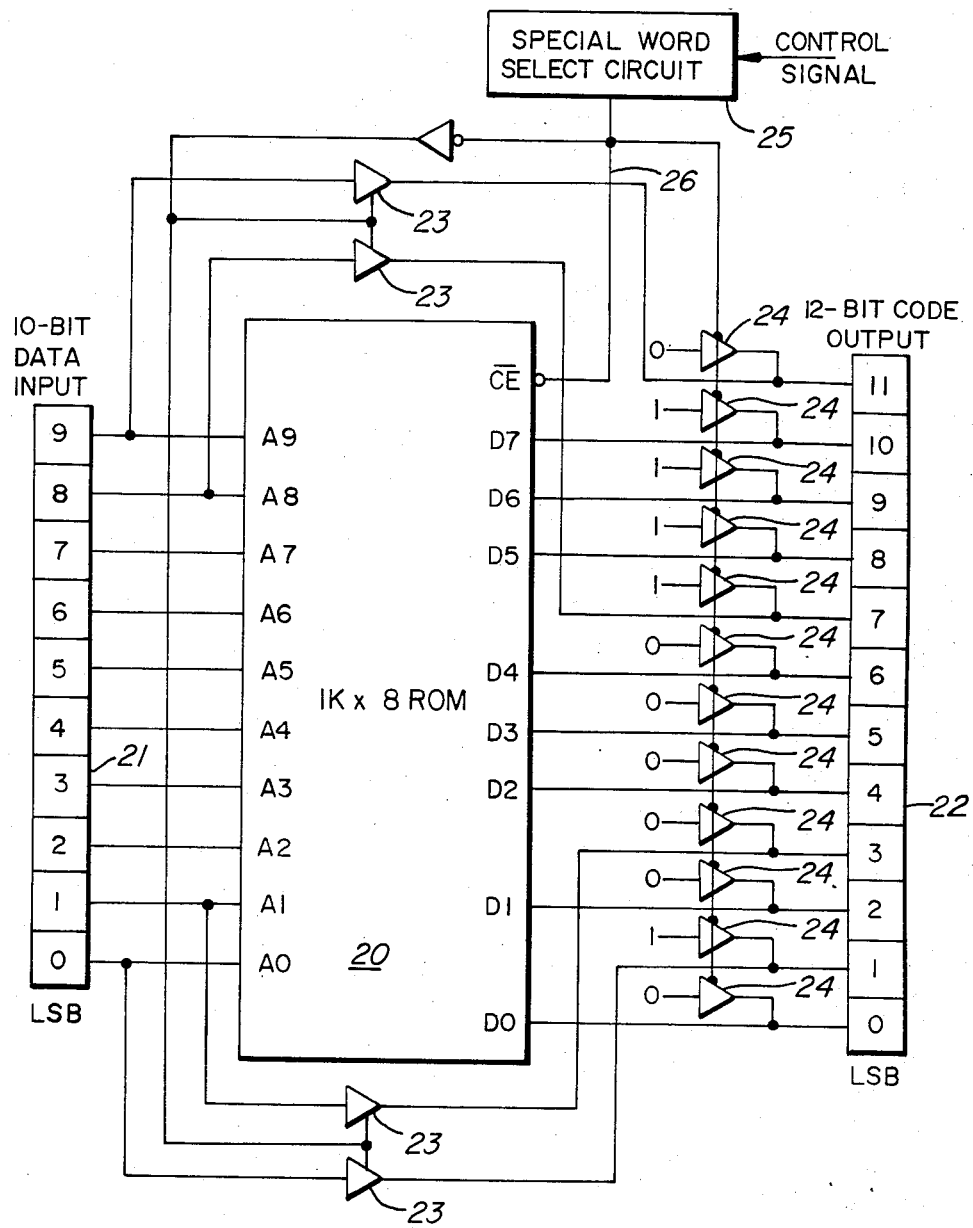
FIG. 2 is a block logic diagram of a circuit for translating binary data into redundantly encoded binary data in accordance with the method of the invention.

FIG. 2 illustrates a circuit for encoding 10-bit data words into 12-bit data words in accordance with the method described above. A ROM 20 is adapted to contain a 1024×8-bit translation table as described above. The 10-bit data words are applied to input terminals 21 which are connected to corresponding inputs of the ROM 20. The outputs of the ROM are each connected to predetermined ones of output terminals 22. The input terminals 21 (0, 1, 8, 9) corresponding to the 4 invariant bits are connected to output terminals 22 (1, 3, 7, 11) through transmission gates 23. A plurality of transmission gates 24 have their outputs connected to respective ones of output terminals 22 and their inputs connected to a source of data. The sequence of bits on the inputs of gates 24 represent a special 12-bit code word which as described above could be the SYNC word or one of the special control words. A special-word select circuit 25 is responsive to a control signal from, for example a controller, for inhibiting the output word from the ROM and the outputs of gates 23 via lead 26. The circuit 25 is also responsive to the control signal for enabling the appearance of a special word connected to the inputs of gates 24 on the output terminals 22.

As indicated above, the position of the invariant bits in the 12-bit code is given from the construction of the code set; however, their allocation in the 10-bit code can be chosen freely. In this case, the choice was made on the basis of minimum impact of errors. The other six data bits appear on the linecode in the eight code bits which are not invariant. Thus, line errors affecting these bits potentially cause a change in none, some, or all of the six data bits after decoding. On the average, it may be expected that a single such line error will cause multiple data errors (within the same byte). Line errors affecting the invariant bits however do not get multiplied by the decoding and are directly propagated to the output. Therefore, for a given error rate, the four invariant bits will on average exhibit fewer data errors than the other coded bits. Thus, the invariant bits should be allocated to the bits representing the more critical information. In this case, the four invariant bits are allocated to bits 0, 1, 8, and 9 of the 10-bit data words. These bits correspond respectively to the parity bit, signalling or control bit, the most significant bit and sign bit of the PCM byte.

Figure 3:
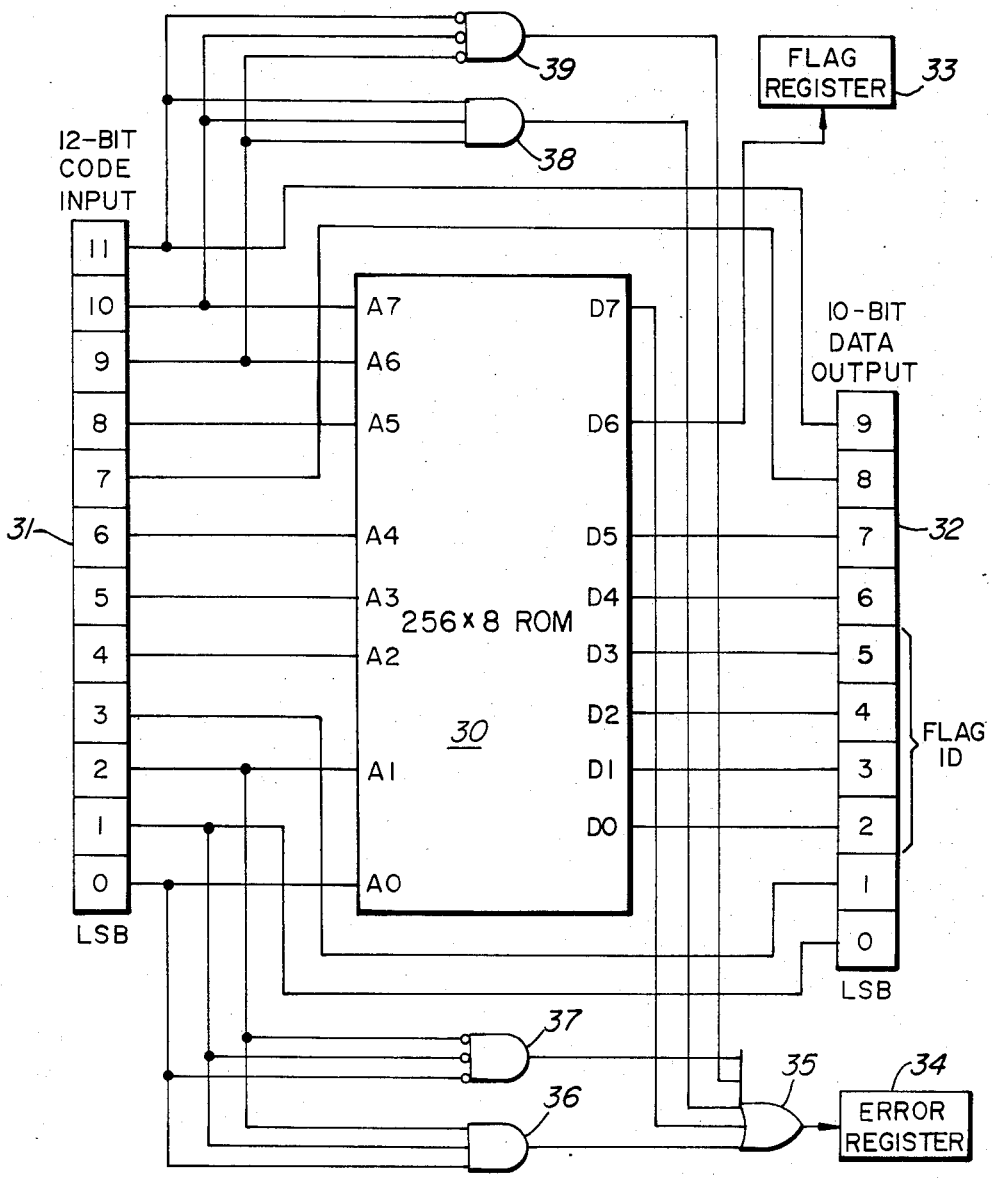
FIG. 3 is a block logic diagram of a circuit for translating redundantly encoded binary data into binary data in accordance with the method of the invention.

FIG. 3 shows a decoder circuit for decoding 12-bit linecode into 10-bit binary words. A ROM 30 adapted to contain 256×8 bits has its 8 inputs (A0–A7) connected to the input terminals 31 (0, 2, 4, 5, 6, 8, 9, 10) corresponding to the bits in the 12-bit code words that are not invariant. The outputs (D0–D5) of the ROM 30 are connected to the output terminals 32 (2, 3, 4, 5, 6, 7) corresponding to the bit positions in the 10-bit words that are not invariant. The input terminals 31 (1, 3, 7, 11) bypass the ROM 30 and are connected directly to the output terminals 32 (0, 1, 8, 9) that correspond to the invariant bit positions in 10-bit words. Whenever the ROM 30 recognizes a special control word, it outputs a signal on terminal D6 to set a flag register 33. The identification of the control signal is represented by the sequence of bits from the outputs D0–D3 of ROM 30; these are available from output terminals 32 (2, 3, 4, 5).

Whenever the ROM 30 detects an invalid input code, it outputs an error signal on terminal D7 to an error register 34 via an OR gate 35. Similarly logic gates 36, 37, and 38, 39 are connected to the input terminals 31 at bit positions 0, 1, 2 and 9, 10, 11 to detect violations of the predetermined criteria for head and tail run-lengths of the encoded 12-bit binary words.

The redundancy inherent in 10-bit–12-bit code provides a certain amount of error detection capability that is theoretically limited to the extent to which errors transform valid code words into invalid code words (50%). The detection capability is reduced further if the decoder implementation does not perform a complete test of validity. In the circuit of FIG. 3, the data decode ROM which converts the eight varilant bits to six data bits can only detect seventeen invalid 8-bit combinations. The separate additional logic circuit comprised of gates 35 to 39 detects all errors indicated by three equal ONEs or ZEROs at either the most significant or least significant bit positions of the 12-bit words. The combination of these two circuits detects 18 per cent of random single-bit errors and 31 per cent of two-bit errors. While this is insufficient to actually protect data integrity, it does provide a very simple and effective method for monitoring line/circuit error rate and general health of the system. It may be noted that additional logic circuits may be employed to check for violation of other code construction rules such as weight or intra run-length within the 12-bit words.

Figure 4:
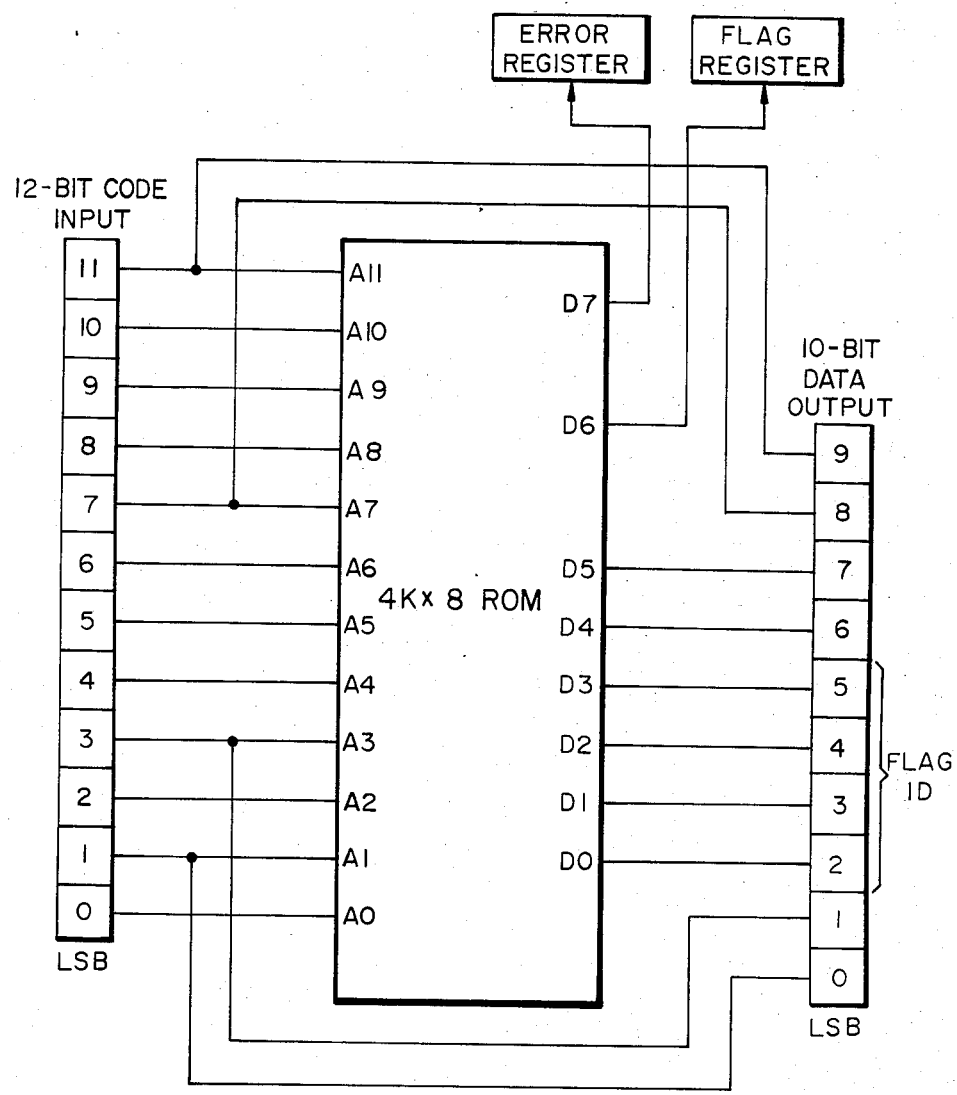
FIG. 4 shows an alternate logic circuit for performing the function achieved by the circuit of FIG. 3.

FIG. 4 is an alternative embodiment to the decoder of FIG. 3. It shows a ROM adapted to contain 4096×8 bits of data which provides full invalid detection of 12-bit codes. When an error is detected an error register is set to inform a controller of the incident. The remainder of the circuit is identical to that of FIG. 3.

Figure 5:
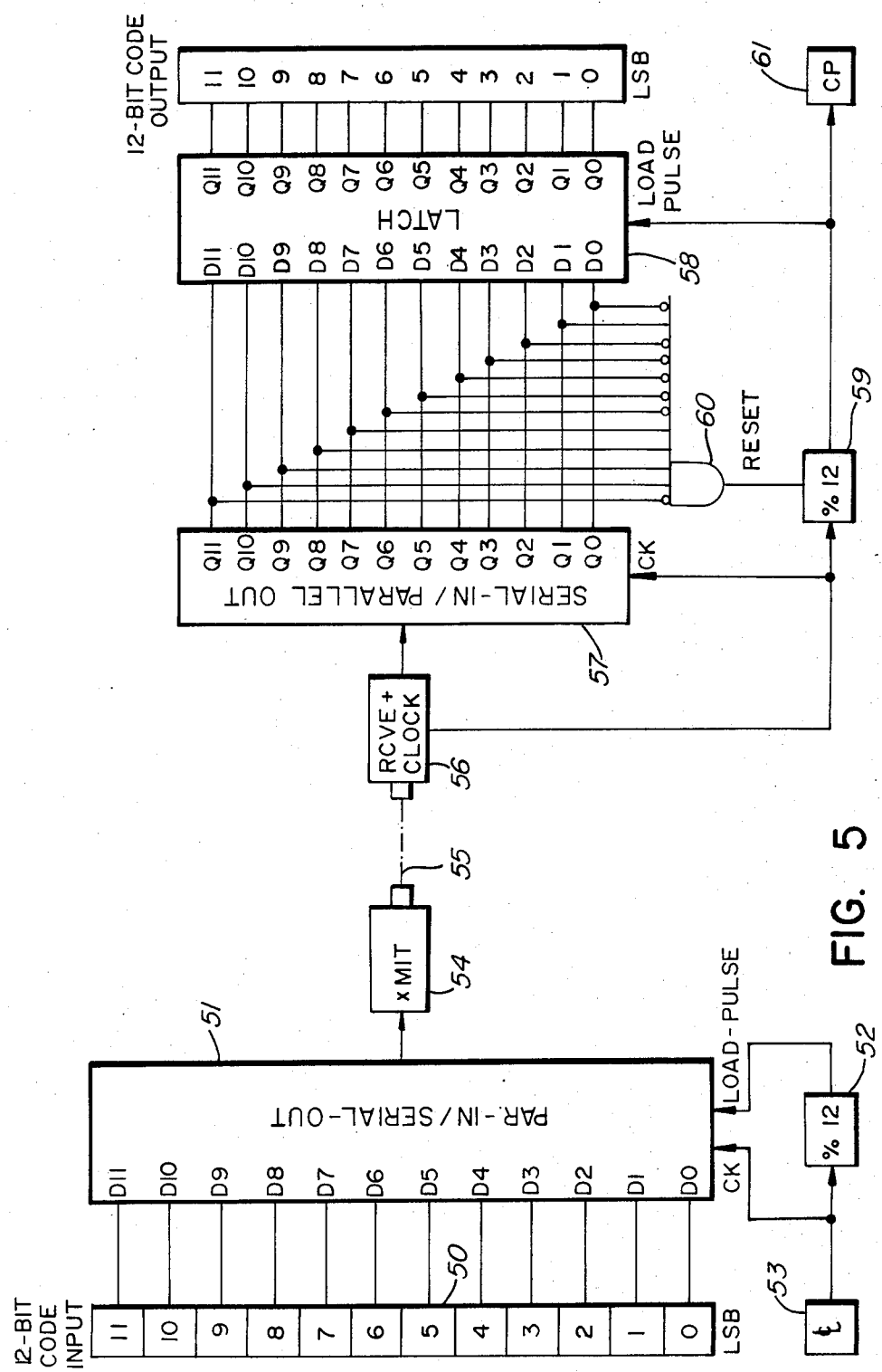
FIG. 5 is a block circuit diagram of a transmission system for transmitting redundantly encoded binary data in accordance with the invention.

FIG. 5 illustrates the elements of a transmission system necessary for the communication of the 12-bit linecode. It shows a plurality of input terminals 50 which could for example be the output terminals 22 of FIG. 2; these are connected to a conventional parallel/serial register 51 which is responsive to a load-pulse signal from a divide-by-twelve counter 52 driven from a clock source 53 to accept a 12-bit word from the input terminals 50 and convert it, under control of the clock signal, into channelized serial binary data. As mentioned above, the coding circuit, for example that of FIG. 2, periodically (e.g. at every frame, channel 0) inserts a SYNC word instead of an encoded binary word. The serial data is fed to a transmitter 54 for transmission on the link 55, to be received by a receive circuit 56 which includes a conventional clock recovery circuit. The serial binary words are fed to a serial/parallel converter circuit 57 which is responsive to the recovered clock signal for converting the serial data into parallel data which is momentarily stored into latch circuit 58 under control of a load pulse derived from the recovered clock by a divide-by-twelve circuit 59. A logic gate circuit 60 is responsive to the word representing the SYNC code appearing on the parallel outputs of circuit 57 for resetting the dividing circuit 59. This incidence appears on a terminal 61 for tranmission to a controller (not shown). The reset pulse indicates that the word presently being received is the data word for channel 0 and is therefore the beginning of a new frame of data. The counter 59 then continues to mark channel pulses until the next SYNC code word is detected. In a system adapted to the transmission of PCM information, the frame reports every 125 microseconds. For a 512 channel system, the channel rate is 4.096 MHz and the transmission code rate is 49.152 Mbs.

The method and circuits of the invention result in a very robust synchronization scheme. The derivation of the SYNC code word ensures that its bit pattern cannot be mimicked by any serial combination of valid data words and that it can only be mimicked by seriously distorted data. Also, since the SYNC code word is immediately recognizable by the circuitry, synchronization is instantly achieved. Upon loss of synchronization, its recovery takes place within less than 125 microseconds. In addition, the binary words encoded in accordance with the invention exhibit a statistically distributed DC balance and an edge density suitable for effective clock recovery at a receiving terminal. Furthermore, the encoding scheme permits the use of translation ROMs having a greatly reduced size from what would be expected through conventional design.

TABLE I

10B12B CODE MAP IN HEXADECIMAL

| 10-bit Data | 12-bit Linecode | | | | | | |
|---|---|---|---|---|---|---|---|
| 000: | 375 | 263 | 269 | 26B | 575 | 266 | 26C | 26E |
| 008: | 675 | 313 | 319 | 31B | 735 | 323 | 329 | 32B |
| 010: | 755 | 346 | 34C | 34E | 765 | 463 | 469 | 46B |
| 018: | 331 | 333 | 339 | 33B | 354 | 356 | 35C | 35E |
| 020: | 355 | 742 | 35D | 74A | 555 | 272 | 55D | 30E |
| 028: | 565 | 752 | 56D | 75A | 731 | 733 | 739 | 50E |
| 030: | 655 | 762 | 65D | 76A | 635 | 743 | 749 | 74B |
| 038: | 345 | 516 | 34D | 51E | 265 | 332 | 26D | 33A |
| 040: | 315 | 352 | 31D | 35A | 771 | 613 | 619 | 61B |
| 048: | 275 | 643 | 649 | 64B | 751 | 753 | 759 | 26A |
| 050: | 371 | 373 | 30D | 31A | 754 | 756 | 75C | 32A |
| 058: | 374 | 376 | 50D | 34A | 235 | 623 | 629 | 62B |
| 060: | 361 | 363 | 369 | 36B | 615 | 672 | 61D | 46A |
| 068: | 625 | 736 | 62D | 52A | 325 | 632 | 32D | 63A |
| 070: | 631 | 633 | 639 | 63B | 714 | 716 | 21D | 71E |
| 078: | 774 | 466 | 46C | 46E | 744 | 746 | 74C | 74E |
| 080: | 531 | 533 | 539 | 53B | 335 | 543 | 549 | 54B |
| 088: | 551 | 553 | 559 | 55B | 761 | 763 | 769 | 70A |
| 090: | 475 | 636 | 709 | 70B | 535 | 433 | 439 | 43B |
| 098: | 465 | 532 | 46D | 53A | 525 | 552 | 52D | 55A |
| 0A0: | 545 | 772 | 54D | 54A | 435 | 646 | 64C | 64E |
| 0A8: | 645 | 652 | 64D | 65A | 365 | 472 | 36D | 22E |
| 0B0: | 671 | 673 | 70D | 51A | 651 | 653 | 659 | 65B |
| 0B8: | 724 | 726 | 22D | 30B | 515 | 662 | 51D | 66A |
| 0C0: | 674 | 523 | 529 | 52B | 745 | 546 | 54C | 54E |
| 0C8: | 571 | 513 | 519 | 51B | 554 | 556 | 55C | 61A |
| 0D0: | 654 | 656 | 65C | 56A | 665 | 316 | 66D | 31E |
| 0D8: | 364 | 366 | 36C | 36E | 351 | 353 | 359 | 61E |
| 0E0: | 661 | 663 | 669 | 62A | 715 | 326 | 71D | 32E |
| 0E8: | 561 | 563 | 569 | 62E | 664 | 666 | 66C | 42E |
| 0F0: | 564 | 566 | 56C | 70E | 574 | 713 | 719 | 34B |

TABLE I-continued
10B12B CODE MAP IN HEXADECIMAL

| 10-bit Data | 12-bit Linecode | | | | | | |
|---|---|---|---|---|---|---|---|
| 0F8: | 725 | 526 | 72D | 52E | 721 | 723 | 729 | 23B |
| 100: | 2E1 | 2E3 | 2E9 | 2EB | 2E4 | 2E6 | 2EC | 2EE |
| 108: | 391 | 393 | 399 | 39B | 3A1 | 3A3 | 3A9 | 3AB |
| 110: | 3C4 | 3C6 | 3CC | 3CE | 4E1 | 4E3 | 4E9 | 4EB |
| 118: | 3B1 | 3B3 | 3B9 | 68A | 3D4 | 3D6 | 3DC | 2CA |
| 120: | 3D5 | 2C6 | 2CC | 2CE | 5D5 | 386 | 38C | 38E |
| 128: | 5E5 | 4C6 | 4CC | 4CE | 7B1 | 586 | 58C | 58E |
| 130: | 6D5 | 2C3 | 2C9 | 2CB | 6B5 | 4C3 | 4C9 | 4CB |
| 138: | 594 | 596 | 3CD | 59E | 2E5 | 3B2 | 2ED | 3BA |
| 140: | 395 | 3D2 | 39D | 3DA | 691 | 693 | 699 | 69B |
| 148: | 2F5 | 6C3 | 6C9 | 6CB | 2C5 | 2E2 | 2CD | 2EA |
| 150: | 385 | 392 | 38D | 39A | 4C5 | 3A2 | 4CD | 3AA |
| 158: | 585 | 3C2 | 58D | 3CA | 6A1 | 6A3 | 6A9 | 6AB |
| 160: | 685 | 4D2 | 68D | 4DA | 695 | 4E2 | 69D | 4EA |
| 168: | 6A5 | 5A2 | 6AD | 5AA | 3A5 | 6B2 | 3AD | 68B |
| 170: | 6B1 | 6B3 | 6B9 | 4CA | 794 | 796 | 689 | 68B |
| 178: | 4E4 | 4E6 | 4EC | 4EE | 2D1 | 2D3 | 2D9 | 2DB |
| 180: | 5B1 | 5B3 | 5B9 | 38A | 3B5 | 5C3 | 5C9 | 5CB |
| 188: | 5D1 | 5D3 | 5D9 | 58A | 2D4 | 2D6 | 2DC | 2DE |
| 190: | 4F5 | 6B6 | 789 | 78B | 5B5 | 686 | 68C | 68B |
| 198: | 4E5 | 5B2 | 4ED | 5BA | 5A5 | 5D2 | 5AD | 5DA |
| 1A0: | 5C5 | 5C2 | 5CD | 5CA | 6C4 | 6C6 | 6CC | 6CE |
| 1A8: | 6C5 | 6D2 | 6CD | 6DA | 4D1 | 4D3 | 4D9 | 4DB |
| 1B0: | 785 | 592 | 78D | 59A | 6D1 | 2D2 | 6D9 | 2DA |
| 1B8 | 7A4 | 7A6 | 389 | 38B | 595 | 6E2 | 59D | 6EA |
| 1C0: | 5A1 | 5A3 | 5A9 | 5AB | 5C4 | 5C6 | 5CC | 5CE |
| 1C8: | 591 | 593 | 599 | 59B | 5D4 | 692 | 5DC | 69A |
| 1D0: | 6D4 | 6D6 | 5EA | 394 | 396 | 589 | 58B |
| 1D8: | 4D4 | 4D6 | 4DC | 4DE | 694 | 696 | 3D9 | 69E |
| 1E0: | 6E1 | 6A2 | 6E9 | 6AA | 4D5 | 3A6 | 4DD | 3AE |
| 1E8: | 6A4 | 6A6 | 5E9 | 6AE | 6E4 | 6C2 | 6EC | 6CA |
| 1F0: | 784 | 5E6 | 78C | 78E | 791 | 793 | 799 | 3CB |
| 1F8: | 2D5 | 5A6 | 2DD | 5AE | 7A1 | 7A3 | 7A9 | 79A |
| 200: | A61 | A63 | A69 | A6B | A64 | A66 | A6C | A6E |
| 208: | B11 | B13 | B19 | B1B | B21 | B23 | B29 | B2B |
| 210: | B44 | B46 | B4C | B4E | C61 | C63 | C69 | C6B |
| 218: | B31 | B33 | B39 | 90E | B54 | B56 | B5C | A4A |
| 220: | B55 | A46 | A4C | A4E | D55 | A72 | B0C | B0E |
| 228: | D65 | C46 | C4C | C4E | 971 | 973 | D0C | D0E |
| 230: | 875 | A43 | A49 | A4B | 935 | C43 | C49 | C4B |
| 238: | B45 | 872 | B4D | D1E | A65 | B32 | A6D | B3A |
| 240: | B15 | B52 | B1D | B5A | 975 | 913 | 919 | 91B |
| 248: | A75 | 946 | 94C | 94E | A45 | A62 | A4D | A6A |
| 250: | B71 | B12 | B0D | B1A | C45 | B22 | C4D | B2A |
| 258: | B74 | B42 | D0D | B4A | A35 | 943 | 949 | 94B |
| 260: | B61 | B63 | B69 | C5A | 915 | C62 | 91D | C6A |
| 268: | 945 | D22 | 94D | D2A | B25 | 936 | B2D | 90B |
| 270: | 974 | 976 | 90D | C4A | A15 | 932 | A1D | 93A |
| 278: | C64 | C66 | C6C | C6E | A51 | A53 | A59 | A5B |
| 280: | D31 | D33 | D39 | B0A | B35 | D43 | D49 | D4B |
| 288: | D51 | D53 | D59 | D0A | A54 | A56 | A5C | A5E |
| 290: | C75 | A13 | A19 | A1B | D35 | 962 | C39 | 96A |
| 298: | C65 | D32 | C6D | D3A | D25 | D52 | D2D | D5A |
| 2A0: | D45 | D42 | D4D | D4A | 961 | 963 | 969 | 96B |
| 2A8: | 931 | 933 | 939 | 93B | B65 | C72 | C59 | C5B |
| 2B0: | 951 | 953 | 959 | D1A | 955 | A52 | 95D | A5A |
| 2B8: | 874 | 876 | B09 | B0B | 871 | 873 | D1D | 87B |
| 2C0: | D21 | D23 | D29 | 91A | D44 | D46 | D4C | 94A |
| 2C8: | D71 | 952 | D19 | 95A | D54 | D56 | D5C | A1A |
| 2D0: | 965 | D62 | 96D | D6A | B14 | B16 | D09 | D0B |
| 2D8: | B64 | B66 | C5C | C5E | B51 | B53 | B59 | C3A |
| 2E0: | 964 | 966 | 96C | 96E | B24 | B16 | C5D | B2E |
| 2E8: | D61 | 916 | D69 | 91E | 954 | 956 | 95C | 95E |
| 2F0: | D64 | A32 | D6C | A3A | D74 | B43 | B49 | B4B |
| 2F8: | A55 | D26 | A5D | D2E | A31 | A33 | A39 | A1E |
| 300: | AE1 | AE3 | AE9 | 8CA | AE4 | AE6 | AEC | 98A |
| 308: | B91 | B93 | B99 | A8A | BA1 | BA3 | BA9 | C8A |
| 310: | BC4 | BC6 | BCC | C9A | CE1 | CE3 | CE9 | C9E |
| 318: | BB1 | 986 | 98C | 98E | BD4 | AC2 | C9D | ACA |
| 320: | AC4 | AC6 | ACC | ACE | B84 | B86 | B8C | B8E |
| 328: | CC4 | CC6 | CCC | CCE | D84 | D86 | D8C | D8E |
| 330: | 8F5 | AC3 | AC9 | ACB | 9B5 | CC3 | CC9 | CCB |
| 338: | D94 | D96 | A89 | A8B | AE5 | BB2 | C89 | C8B |
| 340: | B95 | BD2 | C99 | C9B | 991 | 993 | 999 | 99B |
| 348: | 9C4 | 9C6 | 9CC | 9CE | AC5 | AE2 | ACD | AEA |
| 350: | B85 | B92 | B8D | B9A | CC5 | BA2 | CCD | BAA |
| 358: | D85 | BC2 | D8D | BCA | AB5 | 9C3 | 9C9 | 9CB |
| 360: | 8C5 | CD2 | 8CD | CDA | 995 | CE2 | 99D | CEA |
| 368: | 9C5 | DA2 | 9CD | DAA | BA5 | 9B6 | 989 | 98B |
| 370: | 985 | CC2 | 98D | CCA | A95 | 9B2 | A9D | 9BA |
| 378: | CE4 | 8D2 | CEC | 8DA | AD1 | 8E2 | AD9 | 8EA |
| 380: | DB1 | 8C3 | 8C9 | 8CB | 9A4 | 9A6 | DC9 | 9AE |
| 388: | DD1 | 8C6 | 8CC | 8CE | AD4 | 9A2 | ADC | 9AA |
| 390: | A91 | A93 | A99 | A9B | CB1 | CB3 | CB9 | 9EA |
| 398: | CE5 | A86 | A8C | A8E | DA5 | C86 | CBC | C8E |
| 3A0: | A85 | DC2 | A8D | DCA | CB5 | AA2 | 9E9 | AAA |
| 3A8: | 9B1 | CA2 | 9B9 | CAA | CD1 | AA6 | CD9 | AAE |
| 3B0: | 9D1 | D92 | 9D9 | D9A | C85 | AD2 | C8D | ADA |
| 3B8: | AA5 | 8F6 | B89 | B8B | 8D1 | 8D3 | 8D9 | 8DB |
| 3C0: | DA1 | 992 | DA9 | 99A | DC4 | 9C2 | DCC | 9CA |
| 3C8: | D91 | 9D2 | D99 | 9DA | 8D5 | A92 | 8DD | A9A |
| 3D0: | 8D4 | 8D6 | 8DC | 8DE | B94 | B96 | D89 | D8B |
| 3D8: | CD4 | 8E3 | BE9 | 8EB | 8E5 | CB2 | 8ED | CBA |
| 3E0: | 8E4 | 8E6 | 8EC | 8EE | BA4 | 9A3 | 9A9 | 9AB |
| 3E8: | 9A5 | 996 | 9AD | 99E | 9D4 | CA6 | 9DC | CAE |
| 3F0: | CA5 | AB2 | CAD | ABA | AA1 | AA3 | AA9 | AAB |
| 3F8: | DA4 | CA3 | CA9 | CAB | AB1 | A96 | AB9 | A9E |

What is claimed is:

1. A method of redundantly encoding a set of $2^n$ binary words into $2^m$ binary words, wherein m is greater than n and comprising the steps of:
   selecting from the set of $2^m$ words, a first subset of words meeting predetermined criteria for intra code run-length;
   from the first subset of words, selecting a second subset of words comprising one word for use as a synchronization word and its m distance-one neighbors;
   generating a third subset of words by eliminating from the first subset of words, the words from the second subset as well as all m code words which could produce a non-aligned code word from the second set across channel boundaries; and
   for each of the $2^n$ binary words, selecting a corresponding word from the third subset of words to form a fourth subset of words, the fourth subset of words being adapted to the transmission of serial binary data exhibiting a statistically distributed DC balance and a maximization of inherent clock information.

2. A method of redundantly encoding a set of $2^n$ binary words into $2^m$ encoded binary words, wherein m is greater than n, comprising the steps of:
   selecting from the set of $2^m$ binary words, a first subset of words comprising one word for use as a synchronization word (sync-word) and its m distance-one neighbors, the sync-word meeting predetermined criteria for internal maximum run-length;
   selecting from the set of $2^m$ words, a second subset of words meeting predetermined criteria for head maximum run-length, tail maximum run-length and overall internal maximum run-length, the second subset of words excluding the first subset of words;
   generating a third subset of words by eliminating from the second subset of words all m code words which could produce a non-aligned code word of the first set of words across channel boundaries; and
   selecting from the third subset of words, a fourth subset of words which provide x invariant bits between themselves and the words of the set of $2^n$ binary words.

3. A method of redundantly encoding data as defined in claim 2 and further comprising the step of assigning each code word from the fourth subset of words to one word of the set of $2^n$ binary words so that the m-x bits of the fourth subset of words map uniquely to the remaining n-x bits of the words in the set of $2^n$ binary words.

4. A method of redundantly encoding data as defined in claim 2 wherein n=10 bits, m=12 bits, the sync-word has an internal maximum run-length of four, the 12-bit words exhibit head and tail maximum run-lengths of two and an overall internal maximum run-length of four, and the value of x is four.

5. A method of processing binary data prior to the channelized serial transmission thereof comprising the steps of:
   redundantly encoding each of $2^n$ binary words into a corresponding m-bit coded binary word wherein m is greater than n, the coded binary words having predetermined head, tail, and overall maximum run-lengths, the coded binary words being selected to provide x invariant bits between themselves and the $2^n$ binary words,
   generating an m bit frame synchronization binary word having a predetermined internal run-length, and
   generating a frame of binary data comprising said synchronization word and a plurality of said coded binary words.

6. A method of processing binary data prior to transmission as defined in claim 5 wherein the m-x bits of the $2^m$ coded binary words map uniquely to the n-x bits of the n binary words.

7. A method of processing binary data as defined in claim 6 wherein each of the $2^n$ binary words represents a PCM sample including a sign bit, a parity bit and a signalling bit, the x invariant bits being selected to correspond to the bits in each n word that are likely, on average, to exhibit fewer data errors in the received data.

8. A method of processing binary data as defined in claim 7 wherein the x invariant bits are allocated to the bits of each n word following the priority of signalling bit, parity bit, sign bit and most significant to least significant bits of the PCM sample.

9. A method of processing binary data as defined in claim 8 wherein n=10 bits, m=12 bits, the 12-bit words having head and tail maximum run-lenths of two and an overall internal maximum run-length of four, the synchronization word has an internal maximum run-length of five, the value of x is four, and wherein the x bits correspond to the signalling bit, the parity bit, the sign bit and the most significant bit of the PCM sample.

10. A circuit for the translation of a set of $2^n$ binary words into redundantly encoded binary m words comprising:
   a plurality n of input terminals,
   means for storing a plurality of m words generated in accordance with the method of claim 6, said storing means being responsive to any one of $2^n$ words for outputting a predetermined one of the encoded words, the storing means having n data inputs each one connected to a respective input terminal and only m-x data outputs wherein x represents the number of invariant bits between the n-bit words and the m-bit words,
   a plurality m of output terminals, the m-x data outputs of the storing means being connected to predetermined respective inputs of the output terminals and the inputs of the storing means corresponding to the x bits being connected to the remaining output terminals through respective transmission gates,
   a plurality m of transmission gates having their outputs connected to respective ones of the output terminals and their inputs connected to respective sources of ONE or ZERO levels, the pattern of ONEs and ZEROs defining a predetermined special code word; and
   a special word select circuit responsive to a control signal for inhibiting the output of the storing means and the x-invariant transmission gates and for enabling the plurality of transmission gates thereby causing the predetermined special code word to appear on the plurality of output terminals.

11. A circuit for the translation of binary words into redundantly encoded binary words as defined in claim 10 wherein the pattern of ONE and ZERO data bits connected to the inputs of the plurality of transmission gates represents a synchronization code word.

12. A circuit for the translation of binary words into redundantly encoded binary words as defined in claim 11 wherein the storing means is a read-only-memory.

13. A circuit for the translation of binary words into redundantly encoded binary words as defined in claim 12 wherein n=10, m=12 and the storing means is a 1K×8-bits read-only-memory.

14. A circuit for the translation of encoded binary m words into $2^n$ binary words comprising,
   a plurality of input terminals,
   a plurality of output terminals,
   means for storing a plurality of m-x bit words generated in accordance with the method of claim 6, x representing the number of invariant bits between the n-bit words and the m-bit words, the storing means being responsive to an m-x word for outputting a corresponding n-x word, the m-x inputs of the storing means being connected to predetermined respective ones of the input terminals and the n-x outputs of the storing means being connected to predetermined ones of the output terminals, the input terminals that correspond to the x-bit positions being connected to corresponding predetermined ones of the output terminals.

15. A circuit for the translation of $2^m$ encoded binary words into $2^n$ binary words as defined in claim 14 wherein the storing means is a read-only-memory.

16. A circuit for the translation of $2^m$ encoded binary words into $2^n$ binary words as defined in claim 15 wherein m=12, n=10 and the storing means is a 256×8-bits read-only-memory.

17. A circuit for the translation of $2^m$ binary words into $2^n$ binary words as defined in claim 14 and further comprising first AND gate means connected to the three least significant positions of the input terminals and second AND gate means connected to the three most significant positions of the input terminals, OR gate means responsive to the outputs from the first and second AND gate means for generating an error signal indicating an illegal run-length in the head or tail portions of the m binary word appearing at the input terminals.

18. A circuit for the translation of $2^m$ encoded binary words into $2^n$ binary words as defined in claim 17 wherein the OR gate means is further responsive to an error signal from the storing means indicating that the pattern of bits appearing at the input of the storing means does not correspond to a permissible code.

19. A circuit for the translation of $2^m$ encoded binary words into $2^n$ binary words as defined in claim 18 and further comprising a flag register means responsive to a flag signal from the storing means for indicating that the m word appearing on the input terminals is one of a plurality of special data words.

20. A circuit for the translation of $2^m$ encoded binary words into $2^n$ binary words as defined in claim 19 wherein, on the occurrence of the flag signal, a predetermined plurality of the bits appearing at the output of the storing means represent the identity of the special data word.

21. Apparatus for communicating redundantly encoded binary words each comprising m bits in a channelized serial data format wherein one of the channels is dedicated to a predetermined binary word representing a start-of-frame synchronization signal, comprising:

apparatus for transmitting said m binary words comprising a clock signal source having a predetermined rate;

a first divide-by-m counter circuit responsive to clock signals for generating a load pulse for every m clock pulses, a parallel-to-serial converter circuit responsive to the load pulse for inputting each of the m words and responsive to the clock pulses for outputting the m words in serial format, the transmitting apparatus including a transmit circuit for outputting serial data compatible with the transmission link; and apparatus for receiving the serial data stream including means for regenerating receive clock pulses therefrom; a second divide-by-m counter circuit responsive to the receive clock pulses for generating a load pulse for every m clock pulses; a serial-to-parallel converter responsive to the receive clock pulses for inputting the serial data and for providing a corresponding parallel word having m bits; logic gate means connected at the output of the serial-to-parallel converter circuit and responsive to the m outputs thereof for identifying said binary word representing the synchronization signal and upon said identification, the gate means being adapted to reset the second divide-by-m counter circuit thereby providing an indication of start-of-frame, the receive apparatus further comprising a latch circuit responsive to the resetting of the divide-by-m counter and to subsequent load pulses for temporarily storing the m word outputted by the serial-to-parallel converter.

* * * * *